US011920401B2

(12) United States Patent
Shaaban et al.

(10) Patent No.: US 11,920,401 B2
(45) Date of Patent: Mar. 5, 2024

(54) SLOW CLOSE MECHANISM FOR SLIDING APPLICATIONS

(71) Applicant: KOHLER CO., Kohler, WI (US)

(72) Inventors: Nameer Shaaban, Lewiston, NY (US); Andrew McClure, Murray, KY (US); Riley Baggett, Union City, TN (US); James Leland Marlowe, Troy, TN (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 17/721,811

(22) Filed: Apr. 15, 2022

(65) Prior Publication Data

US 2022/0349231 A1 Nov. 3, 2022

Related U.S. Application Data

(60) Provisional application No. 63/183,316, filed on May 3, 2021.

(51) Int. Cl.

*E05F 5/00* (2017.01)
*E05D 15/06* (2006.01)

(Continued)

(52) U.S. Cl.

CPC .......... *E05F 5/003* (2013.01); *E05D 15/0652* (2013.01); *E05F 1/16* (2013.01); *E05F 5/08* (2013.01); *E05Y 2201/212* (2013.01)

(58) Field of Classification Search

CPC .... E05F 5/003; E05F 1/16; E05F 5/08; E05D 15/0652

See application file for complete search history.

(56) References Cited

U.S. PATENT DOCUMENTS 652,746 A 7/1900 Colburn
784,093 A 3/1905 Adam (Continued)

OTHER PUBLICATIONS

Deltafaucet.com, "Customizable Mod Style Shower Door With Soft Close Technology", URL: https://www.youtube.com/watch?v=hv3_qaHli2Q, publication date Jul. 11, 2018.

(Continued)

*Primary Examiner* — Jeffrey O'Brien
(74) *Attorney, Agent, or Firm* — FOLEY & LARDNER LLP

(57) ABSTRACT

A sliding door includes a frame and a slow close assembly. The frame is positioned along at least a portion of the sliding door and includes a protrusion configured to slide along with the sliding door. The slow close assembly is repositionable between an outward position and a compressed position. The slow close assembly includes a slow close mechanism, a spring, and a soft close latch. The slow close mechanism is laterally positioned within the slow close assembly. The spring is positioned at an end of the slow close assembly and provides an outward force onto the slow close assembly in an outward direction substantially perpendicular to the lateral direction. The soft close latch is configured to engage the protrusion as the protrusion slides along with the sliding door. The spring biases the slow close assembly into the outward position when the latch is not interfaced with the protrusion.

7 Claims, 19 Drawing Sheets

(51) Int. Cl.
*E05F 1/16* (2006.01)
*E05F 5/08* (2006.01)

(56) References Cited

U.S. PATENT DOCUMENTS 962,198 A 6/1910 Decker
6,035,488 A 3/2000 Kawakatsu
6,113,204 A 9/2000 Jahrling et al.
6,408,483 B1 6/2002 Salice
6,473,936 B2 11/2002 Orita
6,553,617 B1 4/2003 Salice
6,591,454 B2 7/2003 Brustle
6,615,450 B2 9/2003 Salice
6,672,692 B2 1/2004 Weng
6,846,053 B2 1/2005 Salice
6,915,716 B2 7/2005 Doornbos et al.
6,957,807 B2 10/2005 Zimmer et al.
6,979,065 B2 12/2005 Egger
6,997,528 B2 2/2006 Yang
7,032,271 B2 4/2006 Lin
7,032,985 B1 4/2006 Ichioka et al.
7,207,087 B2 4/2007 Salice
7,234,569 B2 6/2007 Salice
7,377,500 B2 5/2008 Tomiji et al.
7,562,416 B2 7/2009 Lautenschlager et al.
7,657,970 B2 2/2010 Artsiely
7,730,582 B2 6/2010 Migli
7,748,082 B2 7/2010 Harald et al.
7,784,890 B1 8/2010 Chen
7,788,768 B2 9/2010 Yamamuro
7,845,050 B2 12/2010 Pyo
7,861,371 B2 1/2011 Kim
7,866,003 B2 1/2011 Tooyama
7,878,606 B2 2/2011 Chen et al.
7,914,093 B2 3/2011 Huang
7,926,630 B2 4/2011 Baldreich
7,937,807 B2 5/2011 Bereznai
7,980,640 B2 7/2011 Yang
8,051,534 B1 11/2011 Luca
8,052,232 B1 11/2011 Chen
8,052,233 B2 11/2011 Netzer et al.
8,079,653 B2 12/2011 Huang
8,083,304 B2 12/2011 Hu
8,091,176 B2 1/2012 Salice
8,104,140 B2 1/2012 Bassi
8,123,005 B2 2/2012 Bantle et al.
8,132,873 B2 3/2012 Yang
8,147,010 B2 4/2012 Chen et al.
8,186,014 B2 5/2012 Pecar et al.
8,307,497 B2 * 11/2012 Chang .................... E05F 5/003 16/49
8,366,214 B2 2/2013 Krammer
8,371,542 B2 2/2013 Zhang et al.
8,413,298 B2 4/2013 Domenig et al.
8,459,758 B2 6/2013 Rechberg et al.
8,468,651 B2 6/2013 Lautenschlager
8,468,652 B2 6/2013 Salice
8,561,259 B2 10/2013 Liao
8,579,092 B2 11/2013 Kimura
8,590,989 B2 11/2013 Lowe
8,621,713 B2 1/2014 Zimmer et al.
8,668,062 B2 3/2014 Weber
8,683,653 B2 4/2014 Bettinzoli
8,696,077 B2 4/2014 Huang et al.
8,739,468 B2 6/2014 Yamaguchi et al.
8,745,821 B2 * 6/2014 Chang ...................... E05F 1/16 16/49
8,783,799 B2 7/2014 Chen
8,875,344 B2 11/2014 Salutzki et al.
8,905,498 B2 12/2014 Hammerle
8,910,345 B2 12/2014 Bland et al.
8,925,695 B2 1/2015 Rioja Calvo
8,925,696 B2 1/2015 Zeilenga et al.
8,931,138 B2 1/2015 Shimizu
8,935,829 B2 1/2015 Oshima et al.
8,939,525 B1 1/2015 Chen
8,943,652 B2 2/2015 Bacchetti
8,959,709 B2 2/2015 Hasegawa et al.
8,960,387 B2 2/2015 Yamaguchi
8,979,222 B2 3/2015 Jahrling et al.
8,991,010 B2 3/2015 Brunnmayr
9,033,433 B2 5/2015 Breisacher et al.
9,121,210 B2 9/2015 Rioja Calvo
9,125,491 B2 9/2015 Rehage
9,151,101 B2 10/2015 Lowe
9,295,328 B2 3/2016 Brunnmayr
9,359,801 B2 6/2016 Weber
9,364,089 B1 6/2016 Chen et al.
9,366,067 B2 6/2016 Wu
9,371,675 B2 6/2016 Oshima et al.
9,375,083 B2 6/2016 Haemmerle et al.
9,388,619 B2 * 7/2016 Park ........................ E05F 5/003
9,486,077 B2 11/2016 Brock
9,500,017 B2 11/2016 Sugiura
9,516,948 B2 12/2016 Migli
9,532,648 B2 1/2017 Gasser et al.
9,545,152 B2 1/2017 Egger
9,629,461 B2 4/2017 Egger
9,635,938 B2 5/2017 Kim
9,642,461 B2 5/2017 Goetz et al.
9,648,952 B2 5/2017 Nuckolls
9,657,506 B2 5/2017 Bantle
9,681,576 B2 6/2017 Schroeder et al.
9,708,844 B2 7/2017 Glogowski et al.
9,750,347 B2 9/2017 Nuckolls
9,775,434 B2 10/2017 Flogaus
9,788,655 B2 10/2017 Chen et al.
9,872,563 B2 1/2018 Davis
9,877,582 B2 1/2018 Zhu et al.
9,930,962 B2 4/2018 Chen
9,945,167 B2 * 4/2018 Svara ........................ E05F 3/00
10,028,583 B2 7/2018 Erdel et al.
10,047,818 B2 8/2018 Nakasone
10,138,667 B2 * 11/2018 Graul ...................... E05F 5/003
10,358,856 B2 7/2019 Tomlinson
10,499,737 B2 12/2019 Kim et al.
10,512,328 B2 12/2019 Pan et al.
10,597,923 B2 * 3/2020 Intelmann ............... E05F 5/003
10,669,763 B2 * 6/2020 Torrabias Cantal ...... F16F 9/06
10,674,820 B2 6/2020 Chen et al.
10,724,285 B2 * 7/2020 Dodge ...................... E05F 1/16
10,791,834 B2 10/2020 Chen et al.
10,865,597 B2 * 12/2020 Chen ..................... F16F 9/3485
11,459,811 B2 * 10/2022 Bantle .................... A47B 88/47
2001/0008037 A1 7/2001 Brustle
2003/0062231 A1 4/2003 Muller
2003/0067257 A1 4/2003 Gasser
2003/0141638 A1 7/2003 Salice
2004/0000850 A1 1/2004 Lam Harn et al.
2004/0107536 A1 6/2004 Hollenstein
2004/0174101 A1 9/2004 Lin
2006/0220284 A1 10/2006 Holzapfel
2007/0114896 A1 5/2007 Orita
2007/0251052 A1 11/2007 Pyo
2007/0278919 A1 12/2007 Lu
2009/0033187 A1 2/2009 Chung
2009/0072687 A1 3/2009 Fitz
2009/0090587 A1 4/2009 Tomita
2010/0162521 A1 7/2010 Pyo
2011/0011686 A1 1/2011 Kimura
2011/0094055 A1 4/2011 Domenig et al.
2012/0096679 A1 4/2012 Weber
2012/0180261 A1 7/2012 Zimmer et al.
2013/0028544 A1 1/2013 Lowe
2013/0113355 A1 5/2013 Salice
2013/0239363 A1 9/2013 Apur
2014/0097732 A1 4/2014 Xiao
2014/0290002 A1 10/2014 Lautenschlager
2014/0294328 A1 10/2014 Pecar et al.
2015/0176320 A1 6/2015 Nakasone
2015/0226284 A1 8/2015 Dora
2016/0024829 A1 1/2016 Lowe
2016/0076618 A1 3/2016 Svara et al.
2016/0348414 A1 12/2016 Ivanovic et al.

(56) References Cited

U.S. PATENT DOCUMENTS

| | | | | |
|---|---|---|---|---|
| 2017/0086583 | A1 | 3/2017 | Chen | |
| 2017/0122020 | A1 | 5/2017 | Collene | |
| 2018/0371815 | A1 * | 12/2018 | Intelmann | E05F 3/02 |
| 2022/0316253 | A1 * | 10/2022 | Schwarzmann | E05D 15/58 |

OTHER PUBLICATIONS

Deltafaucet.com, “Mod Frameless Shower Doors”, URL: https://web.archive.org/web/20200815142452/https://www.deltafaucet.com/mod-shower-door#Why Mod, publication date Aug. 15, 2020.

* cited by examiner

SLOW CLOSE MECHANISM FOR SLIDING APPLICATIONS

CROSS-REFERENCE TO RELATED PATENT APPLICATION

This application claims the benefit of and priority to U.S. Provisional Patent Application No. 63/183,316, filed May 3, 2021, which is incorporated herein by reference in its entirety.

BACKGROUND

The present disclosure relates generally to a slow close assembly. More specifically, the present disclosure relates to a controlled slow close mechanism (i.e., the terms "slow close assembly" and "controlled slow close mechanism" are used interchangeable herein) including dampening features for use on sliding door applications.

SUMMARY

At least one embodiment relates to a sliding door. The sliding door includes a frame and a slow close assembly. The frame is positioned along at least a portion of the sliding door and includes a protrusion configured to slide along with the sliding door in a lateral direction. The slow close assembly is repositionable between an outward position and a compressed position. The slow close assembly includes a slow close mechanism, a spring, and a soft close latch. The slow close mechanism is laterally positioned within the slow close assembly. The spring is positioned at an end of the slow close assembly and provides an outward force onto the slow close assembly in an outward direction substantially perpendicular to the lateral direction. The soft close latch is configured to engage the protrusion as the protrusion slides along with the sliding door in the lateral direction. The spring biases the slow close assembly into the outward position when the latch is not interfaced with the protrusion.

Another example relates to a slow close assembly. The slow close assembly includes a frame, a slow close mechanism, a biasing mechanism, and a soft close latch. The frame includes a first track and a second track. The slow close mechanism is laterally positioned within the first track and configured to reposition along a length of the first track. The biasing mechanism is positioned at an end of the slow close assembly and provides an outward force onto the slow close assembly. The soft close latch is configured to receive a portion of a sliding door. The latch is pivotably repositionable between an outer position and an inner position. The latch is in the outer position when the slow close assembly is in an outward position. The latch is in the inner position when the slow close assembly is in a compressed position.

Another example embodiment relates to a slow close assembly. The slow close assembly includes a frame, a slow close mechanism, a biasing mechanism, and a soft close latch. The frame includes a first track and a second track. The slow close mechanism is laterally positioned within the first track and configured to provide a lateral force along the first track. The biasing mechanism is positioned at an end of the slow close assembly and provides an outward force onto the slow close assembly in a direction perpendicular to the first track. The soft close latch is configured to receive a portion of a sliding door. The lateral force provided by the slow close mechanism is greater than the outward force provided by the biasing mechanism.

This summary is illustrative only and should not be regarded as limiting.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION

Figure 1:
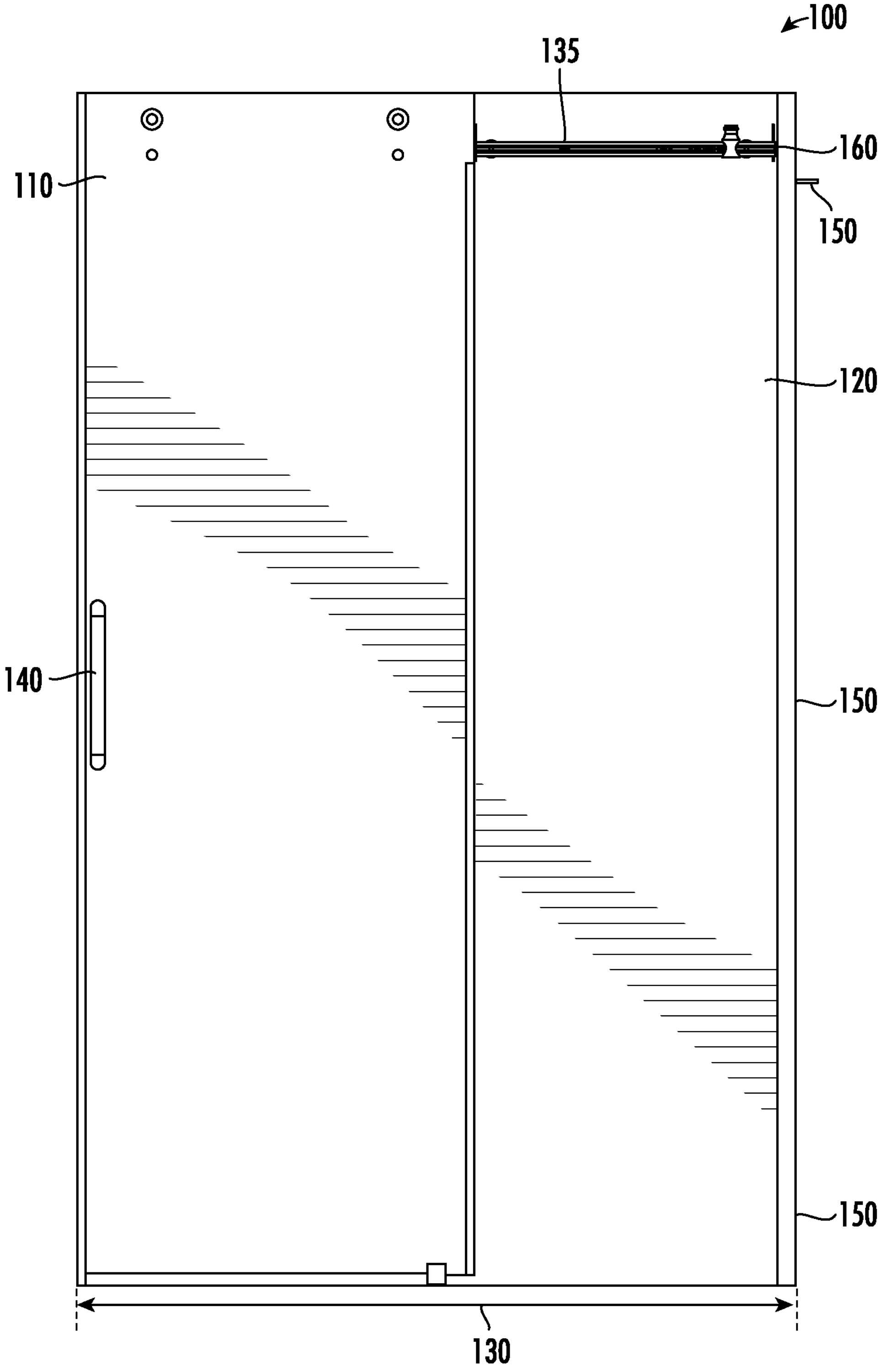
FIG. 1 is a rear view of a sliding door including a slow close assembly according to an exemplary embodiment.
Figure 2:
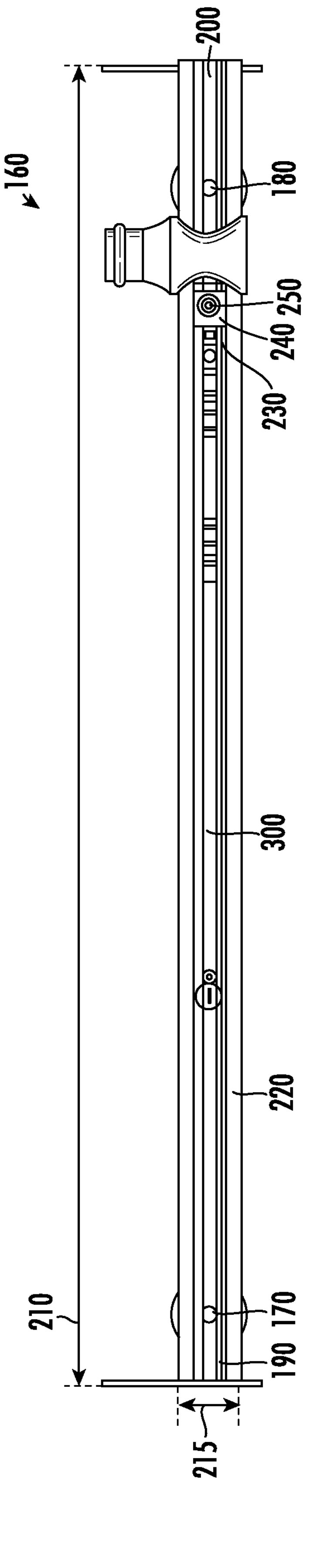
FIG. 2 is a front view of the slow close assembly of FIG. 1, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a slow close assembly is disclosed according to various exemplary embodiments. The slow close assembly may be configured for use on sliding applications, such as shower doors, cabinets, or sliding glass doors. The slow close assembly may include at least one of a spring, a slow close mechanism, or a soft close latch. According to various embodiments, the slow close assembly is selectively coupled to a body, where the sliding doors can be selectively repositionable along a rail of the body. The slow close assembly may be slidably coupled to the rail. In this way, individual parts of the slow close assembly may translate in and out of engagement with the rail by sliding along the length of the rail. Additionally, the rail is pivotably provided within the system, where the rail pivots about a point positioned proximate an end of the rail, between an outward position and an inner position.

According to an example embodiment, the spring of the slow close assembly may be disposed between the spring housing and the body. The spring may be configured to dampen impact forces acted onto the system from heavy and fast moving objects (e.g., panels or glass). The spring may have a bias such that the spring may be constantly in positive engagement. The spring may be selectively repositionable between a ready state and a compressed state. When the spring may be in the ready state, there may be no impact forces acting onto the system. When the spring may be in the compressed state, the spring may be dampening impact forces acted onto the system. In some embodiments, the spring may always be dampening impact forces. In still some embodiments, the spring may not dampen any impact forces. The slow close mechanism may be configured to provide initial system dampening when the sliding doors are engaged in a horizontal direction. In some embodiments, the sliding doors may dampen impact forces in the vertical direction.

The soft close latch may be selectively repositionable between a first position and a second position, where the position of the soft close latch may be determined by the bias of the spring assembly. The soft close latch may extend outward when not in engagement with the sliding doors. In such an embodiment, the sliding doors engage the soft close latch when engaged along a horizontal axis. In some embodiments, the soft close latch may include a fixed position where soft close latch is not selectively repositionable by the spring assembly. The slow close assembly may be positioned along both of the sliding doors, such that impact dampening may occur in various directions. In some embodiments, the slow close assembly may only be positioned on a single door, such that impact dampening may occur in a single direction.

Referring to FIG. 1, a shower door assembly, shown as sliding doors 100, is shown according to an exemplary embodiment. The sliding doors 100 include a first door 110 and a second door 120. The first door 110 and the second door 120 are slidably coupled to one another along a length of the sliding doors, shown as sliding doors length 130. In some embodiments, the sliding doors 100 may include more than two doors. In still some embodiments, the sliding doors 100 may include a single door. In other embodiments, one of the first door 110 and the second door 120 may slide, while the other is fixed. The first door 110 may be slidably coupled to the second door 120 along a track, shown as fixed track 135. The fixed track 135 may be disposed along the entire length 130 of the sliding doors 100. The first door 110 may be configured to translate along the sliding doors length 130 such that the first door 110 may at least partially overlap the second door 120. In some embodiments, the second door 120 may be configured to translate along the sliding doors length 130 such that the second door 120 may at least partially overlap the first door 110. The first door 110 may further include a door handle, shown as handle 140, fixedly coupled to the first door 110. In some embodiments, the handle 140 may be positioned on the second door 120. The handle 140 may be configured to provide support to a user when moving the first door 110 along the sliding doors length 130. In some embodiments, the handle 140 may provide additional support to the user when moving through the sliding doors 100.

The second door 120 may be fixedly coupled to a wall through interfaces, shown as wall mounts 150. The wall mounts 150 are positioned vertically on the side of the second door 120 to provide further support to the frame of the sliding doors 100. As shown, the sliding doors 100 include three individual wall mounts 150. The wall mounts 150 are positioned at the top of the second door 120, at the middle of the second door 120, and at the bottom of the second door 120. In some embodiments, the wall mounts 150 may be placed in a single location. In still some embodiments, the sliding doors 100 may include additional wall mounts 150, positioned at different locations along the second door 120. In still some embodiments, the sliding doors 100 may include less wall mounts 150, positioned at different locations along the second door 120. In still some embodiments, the first door 110 may include any combination of wall mounts 150, positioned along the first door 110.

The second door 120 further includes a dampening assembly, shown as slow close assembly 160. The slow close assembly 160 may be positioned along the top of the second door 120, parallel to the sliding doors length 130. In some embodiments, the slow close assembly 160 may be positioned on the first door 110. In still some embodiments, the slow close assembly 160 may be positioned on both the first door 110 and the second door 120. In still some embodiments, the slow close assembly 160 may be positioned at the bottom of at least one of the first door 110 and the second door 120. According to an exemplary embodiment, the slow close assembly 160 is positioned within a header of the doors. The slow close assembly 160 may be configured to dampen impact forces acting on the sliding doors 100 through shock absorbing capability.

Referring now to FIGS. 2-6, various views of the slow close assembly 160 of FIG. 1 is shown. As shown, the slow close assembly may be fixedly coupled to the second door 120 through the first coupling 170 and the second coupling 180. The first coupling 170 may be positioned proximal to a first body end 190 and the second coupling may be positioned proximal to a second body end 200. In some embodiments, the first coupling 170 and the second coupling 180 may be positioned proximal to the first body end 190. In still some embodiments, the first body end 190 and the second body end 200 may be positioned proximal to the second body end 200. The slow close assembly 160 may be configured to be positioned a specific distance from the edge of the sliding doors 100, such that the slow close assembly does not abut a shower wall when engaged.

The slow close assembly 160 further includes a body length 210, positioned between the first body end 190 and the second body end 200. The first body end 190 and the second body end 200 define the body length 210 such that the distance between the first body end 190 and the second body end 200 may be the same as the body length 210. In some embodiments, the body length 210 may be larger than the distance between the first body end 190 and the second body end 200. In still some embodiments, the body length 210 may be shorter than distance between the first body end 190 and the second body end 200. The body length 210 may be aligned with the length of the slow close assembly 160, parallel to the sliding doors length 130. In some embodiments, the body length 210 may only be positioned along a portion of the slow close assembly 160. The slow close assembly further includes a body height 215. As shown, the body height 215 may be uniform along the entire length of the slow close assembly 160 and be shorter than the body length 210. In some embodiments, the body height 215 may be larger than the body length 210. In still some embodiments, the body height 215 may have various distances along the length of the slow close assembly 160.

The slow close assembly 160 may be disposed within a body portion, shown as body 220. The body 220 may be configured to support at least a portion of the slow close assembly 160. The body 220 may be disposed along the entire length of the sliding doors 100. In some embodiments, the body 220 may be disposed along at least a portion of the sliding doors 100. The body 220 may be further configured to be positioned at the top of the sliding doors 100, where the body 220 functions as a header. In some embodiments, the body 220 may be configured to be positioned at the bottom of the sliding doors 100, where the body 220 functions as a footer. In still some embodiments, the body 220 may be positioned at both the top and the bottom of the sliding doors 100, where the slow close assembly 160 may be disposed within at least one of the bodies 220. The body 220 may be fixedly coupled to at least one of the first body end 190 and the second body end 200. In some embodiments, the body 220 may not be fixedly coupled to either the first body end 190 or the second body end 200. The slow close assembly 160 further includes a spring assembly 230 disposed within the body 220. The spring assembly 230 may be positioned proximal to the second coupling 180. In some embodiments, the spring assembly 230 may be positioned proximal to the first coupling 170. The spring assembly 230 may be configured to selectively reposition the slow close assembly 160 in such a configuration where the impact force introduced to the system may be dampened.

The slow close assembly 160 can be used with a variety of sliding door configurations and designs. For example, the slow close assembly 160 may be assembled onto sliding doors 100 that include different dimensions (e.g., larger or smaller) than what is disclosed. In some embodiments, the slow close assembly 160 may be assembled onto cabinets to further dampen impact forces when closing the cabinet. The slow close assembly 160 may be configured to accommodate multiple arrangements of manufacturing door tolerances without additional adjustments from the user (e.g., installer).

Figure 6:
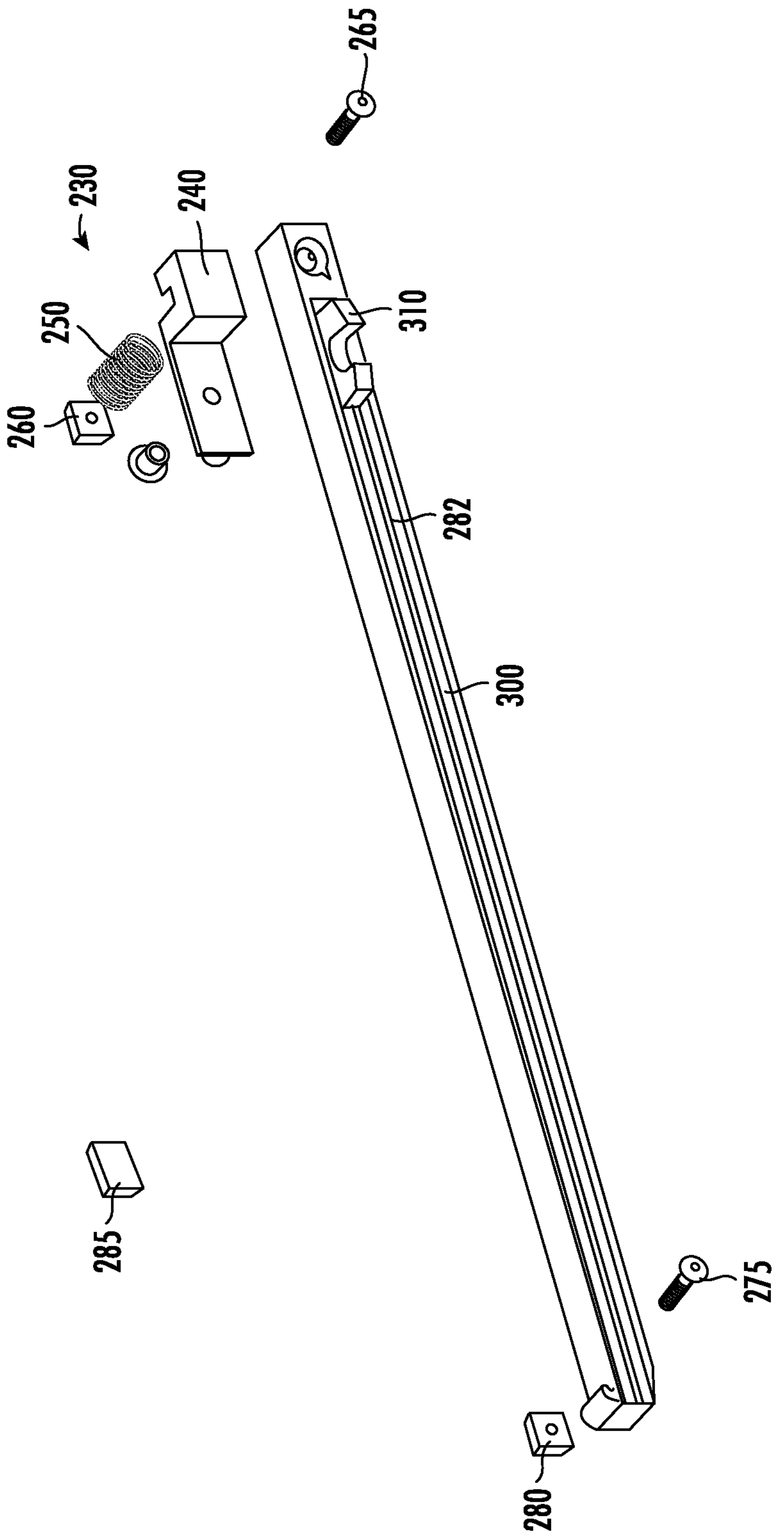
FIG. 6 is a detailed view of the slow close assembly of FIG. 1, according to an exemplary embodiment.

As shown in FIG. 6, the spring assembly 230 may include a spring holder 240 and a compression spring 250. The spring holder 240 may be positioned between the body 220 and the compression spring 250. The spring holder 240 may be configured to support the compression spring 250 when the slow close assembly 160 is in various configurations. As shown, the spring holder 240 may be manufactured individually and assembled to the slow close assembly 160. Manufacturing individual pieces facilitates decreased maintenance efforts and costs by only focusing on smaller pieces rather than a whole assembly. In some embodiments, the spring holder 240 may be manufactured in conjunction with the slow close mechanism 300 such that the spring holder 240 and the slow close assembly 160 are an integral part (i.e., a single unitary part that encompasses both the spring holder 240 and the slow close mechanism 300). As shown in FIG. 6, the compression spring 250 abuts the spring holder 240 and an assembly nut 260. The assembly nut 260 may be configured to translate along the body 220 such that the spring assembly 230 may be fixedly coupled to the body 220. In some embodiments, the assembly nut 260 may be selectively repositionable along the length of the body 220.

Figure 12:
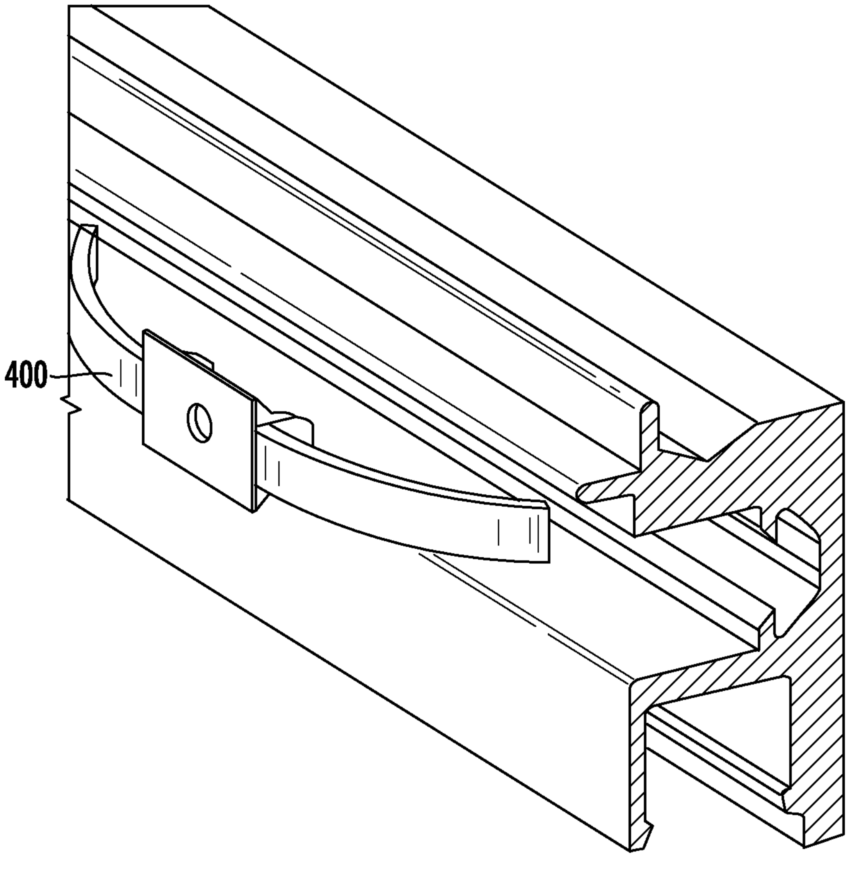
FIG. 12 is a perspective view of a leaf spring for the slow close assembly of FIG. 2, according to an exemplary embodiment.

In some embodiments, alternate components other than the disclosed compression spring 250 may be used within the spring assembly 230. By way of example, the spring assembly 230 may include a leaf spring 400 (i.e., as shown in FIG. 12). The leaf spring 400 may be configured to be positioned in place of the compression spring 250. The leaf spring 400 may bias the slow close assembly 160 into the outward position. In still some embodiments, alternate components manufactured out of an elastic material (e.g., rubber, etc.) may be used in place of the compression spring 250.

Figure 3:
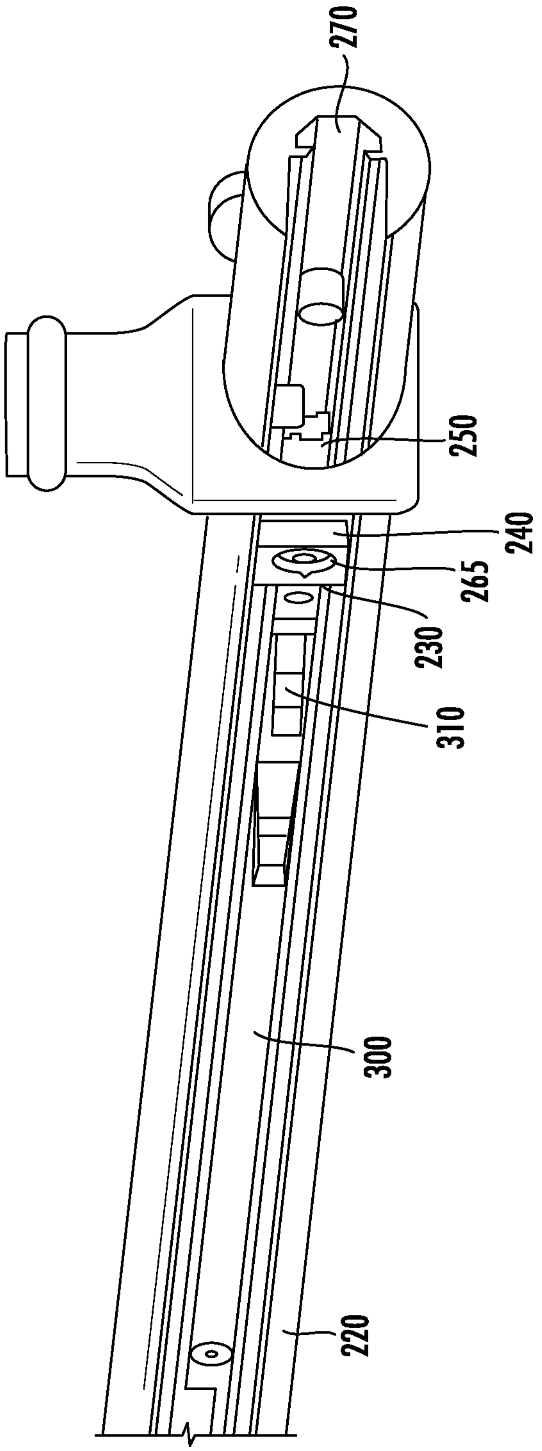
FIG. 3 is a perspective view of the slow close assembly of FIG. 1, according to an exemplary embodiment.
Figure 4:
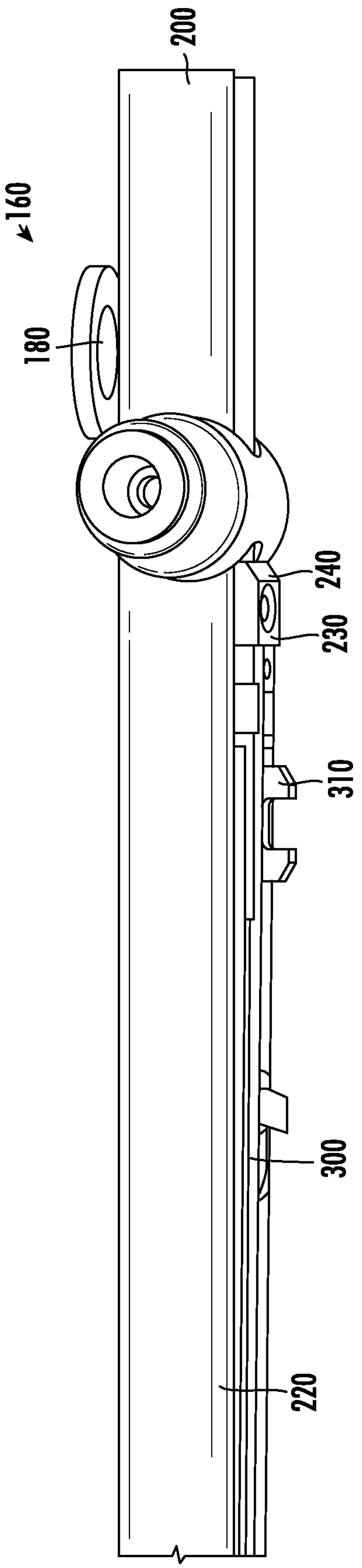
FIG. 4 is a top view of the slow close assembly of FIG. 1, according to an exemplary embodiment.
Figure 5:
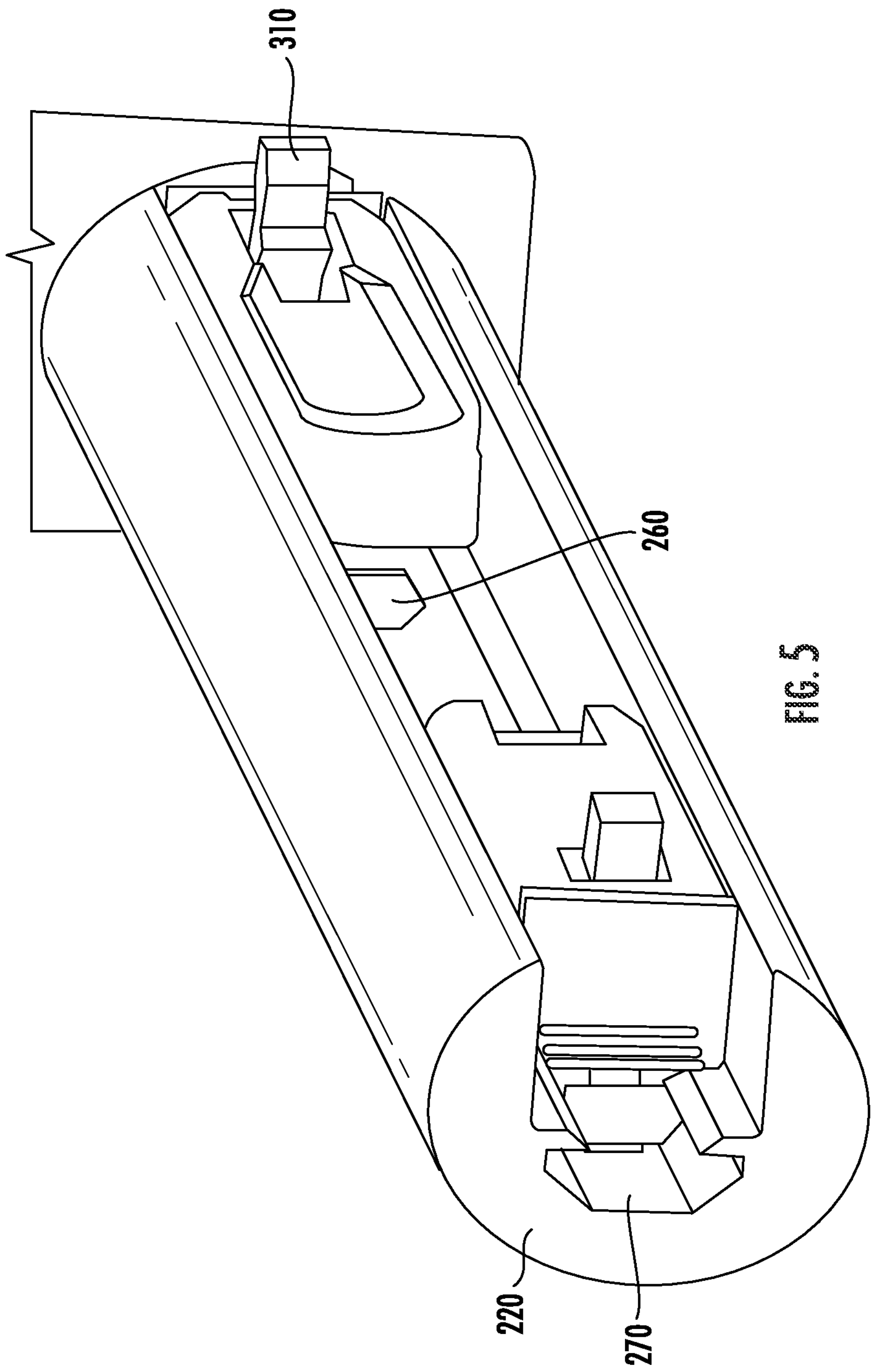
FIG. 5 is a detailed, perspective view of the slow close assembly of FIG. 1, according to an exemplary embodiment.

As shown in FIG. 3, the body 220 includes a series of tracks or guides, shown as rail 270. The rail 270 may be a trapezoidal structure (e.g., trapezoidal groove or slot) and extend along the entire length of the body 220. In some embodiments, the rail 270 may be configured to have an alternate structure (e.g., circular groove or slot, rectangular groove or slot, etc.). In still some embodiments, the rail 270 may not extend along the entire length of the body 220. The assembly nut 260 may be configured to be selectively coupled to the rail 270. The assembly nut 260 interfaces with a bolt 265 (e.g., screw, etc.) to provide a clamping force between the slow close assembly 160 and the body 220. In some embodiments, the assembly nut 260 may interface with the bolt 265 to provide an extending force, positioning the slow close assembly 160 distal to the body 220. In still some embodiments, the bolt 265 may interface with the assembly nut 260 where the assembly nut 260 may not be selectively repositionable along the rail 270.

As shown in FIG. 6, the slow close assembly 160 further includes a second assembly nut 280 positioned proximal to the first body end 190. The second assembly nut 280 may be disposed within the rail 270 and configured to be selectively repositionable along the length of the body 220. The second assembly nut 280 may be fixedly coupled to the body 220 by a second bolt 275 or other fastener (e.g., screw, etc.). When the second assembly nut 280 is fixedly coupled to the body 220, the slow close assembly 160 may be prohibited from lateral movement within the body 220. In some embodiments, the slow close assembly may be able to have lateral movement within the body 220 when the second assembly nut 280 is fixedly coupled to the body 220. The slow close mechanism 300 includes a track, shown as track 282. The track may be configured to be disposed within the slow close mechanism 300 along the entire length of the slow close assembly 160.

The slow close assembly 160 may be selectively coupled to the body 220 by sliding in and out of engagement with the rail 270. To remove the slow close assembly 160, both the bolt 265 and the second bolt 275 may need to be loosened to at least allow the assembly nut 260 and the second assembly nut 280 to slide freely within the rail 270. The slow close assembly 160 may then slide out of engagement with the body 220. In such an embodiment, the slow close assembly 160 may be removed by pulling the slow close assembly 160 away from the body 220. In this embodiment, the bolt 265 and the second bolt 275 may be completely removed so that the assembly nut 260 and the second assembly nut 280 are not coupled to the slow close assembly 160. As listed, the removal techniques do not involve removing the body 220 from the sliding doors 100, thus the slow close assembly 160 may also be installed as an aftermarket product and independent from the sliding doors 100 installation.

In some embodiments, assembly nut 260 and the second assembly nut 280 may be hammer nuts 285 (e.g., as shown in FIG. 6) configured to rotate. In such an embodiment, the hammer nuts 285 may be rotated 90 degrees to lock and unlock within the rail 270. To remove the slow close assembly 160 from the body 220, the hammer nuts 285 are rotated 90 degrees to release the slow close assembly. Once released, the slow close assembly 160 may be pulled straight out, perpendicular to the body 220. In some embodiments, the hammer nuts 285 may be offered in a primary configuration. In still some embodiments, the hammer nuts 285 may be offered in a secondary configuration (e.g., aftermarket). Additionally or alternatively, the compression spring 250 may reduce an overall installation time. With the compression spring 250 constantly engaging the slow close assembly 160 into an outward direction to constantly maintain contact between the latch 210 and the sliding door. This results in less trial by the installer to find the ideal arrangement.

The slow close assembly 160 further includes a slow close mechanism 300, slidably coupled to the slow close assembly 160. The slow close mechanism 300 may be positioned proximal to the second body end 200 such that the slow close mechanism 300 may be selectively repositionable in and out of contact with the body 220. In some embodiments, the slow close mechanism 300 may only be selectively repositionable between the first body end 190 and the second body end 200. The slow close mechanism 300 may be configured to dampen impact forces introduced into the system. The slow close mechanism 300 may be the primary system dampener. In some embodiments, the slow close mechanism 300 may be the secondary system dampener. Positioned between the slow close mechanism 300 and the spring assembly 230 may be a latch, shown as soft close latch 310. The soft close latch 310 is coupled to the slow close mechanism 300 along the length of the body 220. The soft close latch 310 may be selectively repositionable between a first position and a second position by pivoting about the second assembly nut 280. In some embodiments, the soft close latch 310 may be selectively repositionable between the first position and the second position by pivoting about the assembly nut 260. In the first position, the soft close latch 310 may be pivoted away from the body 220 where the sliding doors 100 may interact with the soft close latch 310. The soft close latch 310 may be in the second position when the sliding doors 100 are engaged and interact with the soft close latch 310. In some embodiments, the soft close latch 310 may be in a fixed position.

In some embodiments, the slow close mechanism 300 includes an additional spring (not shown) disposed between the slow close mechanism 300 and the soft close latch 310. The additional spring may be configured to be coupled to the soft close latch 310, such that the soft close latch 310 is biased proximate the second body end 200 (i.e., the spring interfaces with the soft close latch 310 to push the soft close latch 310 towards the second body end 200. In some embodiments, the additional spring may be configured to bias the soft close latch 310 towards the first body end 190.

The compression spring 250 may be further configured to bias the components (e.g., spring assembly 230, spring holder 240, assembly nut 260, soft close latch 310, etc.) in a particular orientation. In this orientation, the compression spring 250 provides a force that positions the components distal to the body 220. In some embodiments, the compression spring 250 may position the components proximal to the body 220. The bias positions the soft close latch 310 in the first position where the soft close latch 310 may interact with the sliding doors 100. In some embodiments, the compression spring 250 may provide a bias onto the slow close mechanism 300 when the soft close latch 310 may be in the second position. In such an embodiment, at least one of the sliding doors 100 does not provide enough force to overcome the bias presented by the compression spring 250. When the soft close latch 310 and the sliding doors 100 engage, the soft close latch 310 catches to the sliding doors 100 in a pocket. This interaction engages the slow close mechanism 300 to dampen the impact force. The compression spring 250 may be further configured to provide secondary system dampening, when the soft close latch 310 engages the sliding doors 100. The resulting combination of the compression spring 250 and the slow close mechanism 300 provide a double damping feature.

Figure 7:
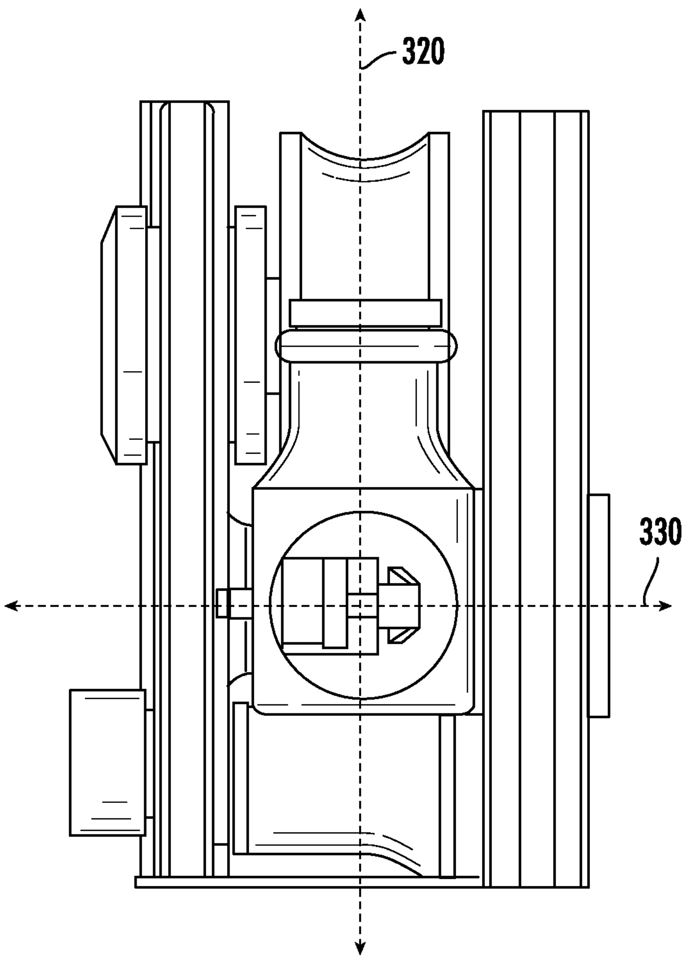
FIG. 7 is a detailed, side view of the slow close assembly of FIG. 1, according to an exemplary embodiment.

As shown in FIG. 7, a detailed, side view of the slow close assembly 160 of FIG. 1 is shown. As shown, the slow close assembly 160 includes a vertical axis 320, positioned at the midpoint of the body 220. The vertical axis 320 may be positioned along the midpoint of a roller assembly such that the slow close assembly 160 may be positioned directly below the roller assembly. In some embodiments, the vertical axis 320 may be positioned offset to the midpoint of the roller assembly. The slow close assembly 160 further includes a horizontal axis 330, positioned at the midpoint of the body 220. The first coupling 170 and the second coupling 180 are both positioned along the horizontal axis 330. In some embodiments, at least one of the first coupling 170 and the second coupling 180 may not be positioned along the horizontal axis 330. The horizontal axis 330 may be positioned at the midpoint of the slow close assembly 160. In some embodiments, the horizontal axis 330 may be positioned away from the midpoint of the slow close assembly 160.

Figure 8:
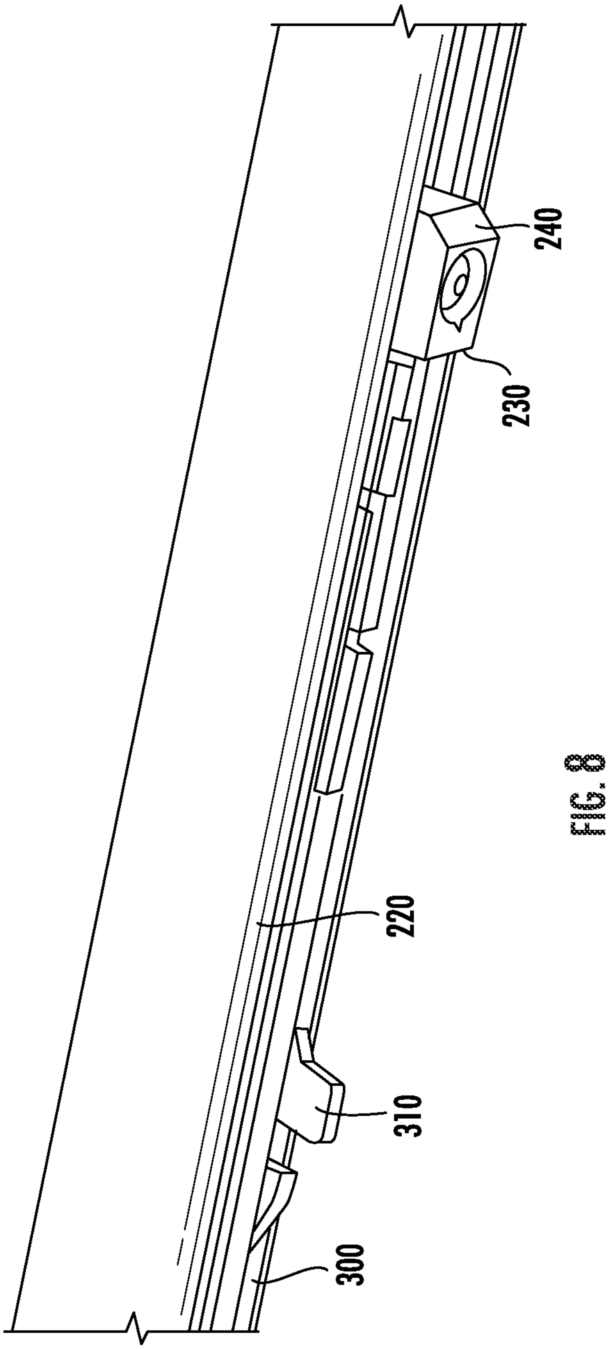
FIG. 8 is a detailed, perspective view of the slow close assembly of FIG. 2, in a ready state, according to an exemplary embodiment.
Figure 13:
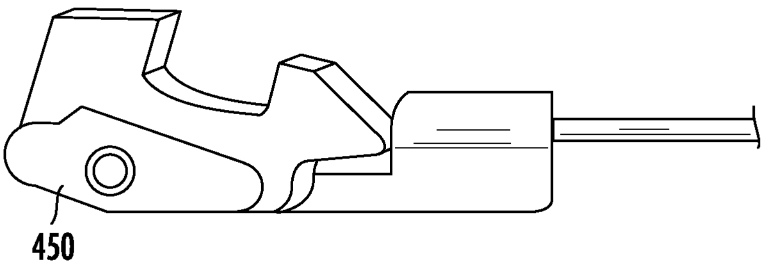
FIG. 13 is a front view of a soft close latch including a locking mechanism, according to an exemplary embodiment.
Figure 14:
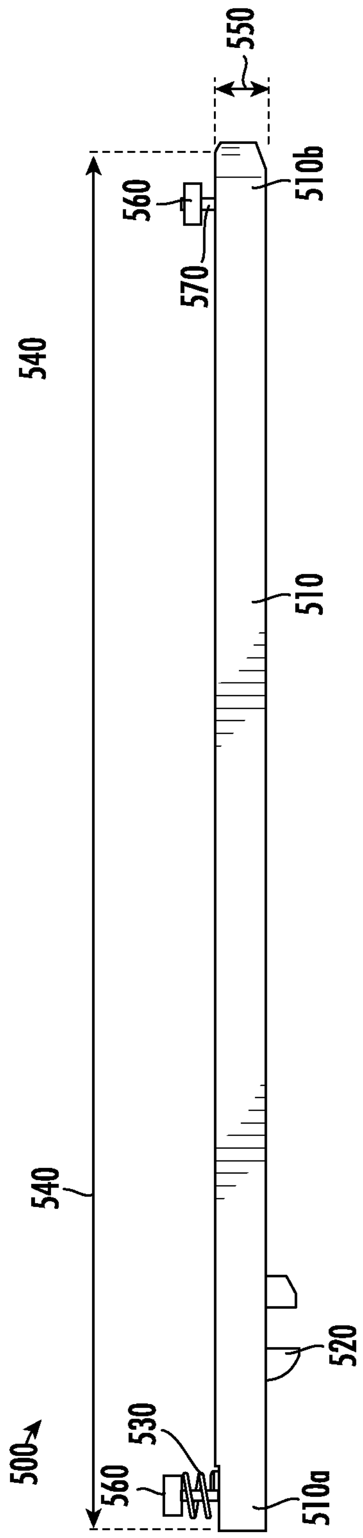
FIG. 14 is a top view of a slow close assembly, according to an exemplary embodiment.
Figure 15:
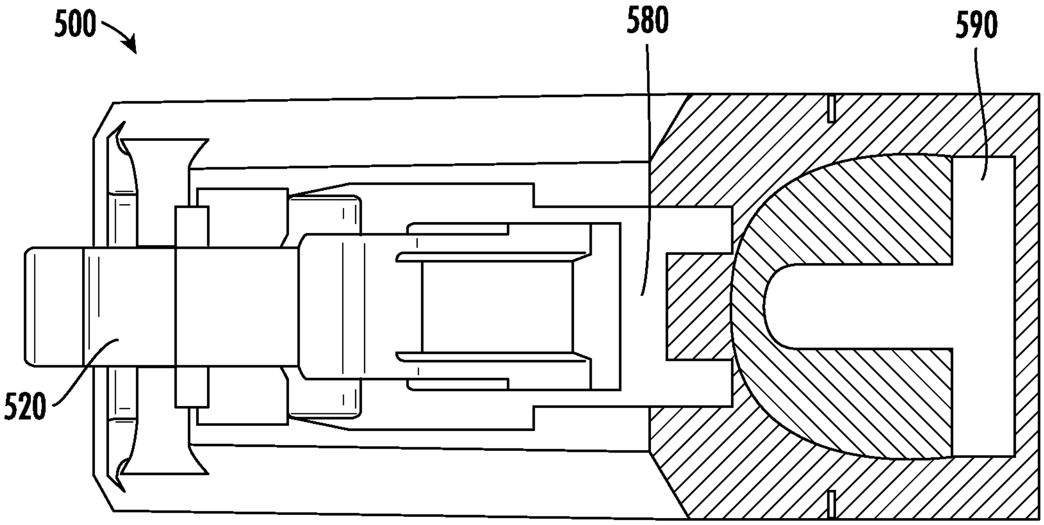
FIG. 15 is a detailed perspective view of the slow close assembly of FIG. 14, according to an exemplary embodiment.

Referring to FIG. 8, a perspective view of the slow close assembly 160 of FIG. 1 is shown, in a ready position. In such an embodiment, the compression spring 250 may be configured to provide the bias on the spring assembly 230, the slow close mechanism 300, and the soft close latch 310. The compression spring 250 may be further configured to absorb the impact force when in the ready position. As shown, the compression spring 250 positions the spring assembly 230 and the soft close latch 310 distal to the body 220. The bias distance is determined by the bolt 265. The bolt 265 may be fastened such to allow a gap between a bolt face and the body 220. In some embodiments, the bolt 265 may be completely fastened such to allow minimal movement of the spring assembly 230. In still some embodiments, the bolt 265 may not determine the bias distance, where the distance is determined by an alternate bumper or stop. The bias distance created by the compression spring 250 may be defined to position the soft close latch 310 on the same contact plane as the sliding doors 100 to ensure that the system may interact with the sliding doors 100 to receive the impact force. The impact will not be dampened if the soft close latch 310 does not interact with the sliding doors 100, resulting in a hard stop and the increased potential of damaging components. In the ready position, the soft close latch 310 interacts with a locking mechanism 450 (e.g., shown in FIG. 13). The locking mechanism 450 may be an extrusion disposed within the soft close latch 310, where the soft close latch 310 may be rotated into the ready position such that the locking mechanism 450 becomes larger than the track 282. In some embodiments, the locking mechanism 450 may be a ball and socket, where the soft close latch 310 may be held stationary until the sliding doors 100 interface with the slow close mechanism 300. The locking mechanism 450 may be configured to interface with the slow close mechanism 300, when the soft close latch 310 may be in the ready position, to hold the soft close latch 310 stationary.

In some embodiments, the compression spring 250 may bias mechanisms other than the slow close mechanism 300. The compression spring 250 may be configured to be universal and may be assembled onto other closing mechanisms. The compression spring 250 may be assembled onto door hinges, locking mechanisms, and other embodiments that may utilize an actuator.

Figure 9:
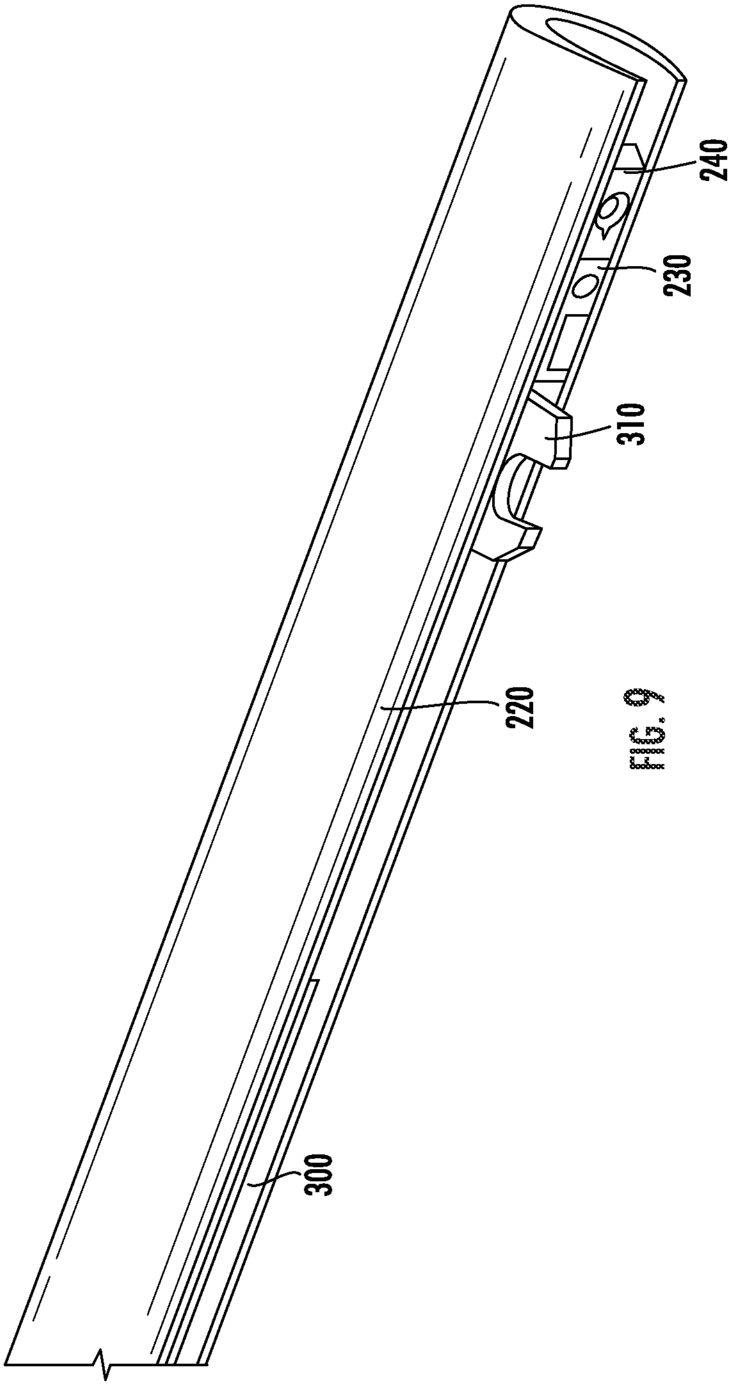
FIG. 9 is a detailed, perspective view of the slow close assembly of FIG. 2, in a compressed state, according to an exemplary embodiment.

Referring now to FIG. 9, a perspective view of the slow close assembly 160 of FIG. 1 is shown, in the compressed position. As shown, the compression spring 250 may be positioned proximal to the body 220. In such an embodiment, the spring assembly 230 may be positioned flush to the body 220 such to provide minimal interaction between the sliding doors 100 and the spring assembly 230 when in use. In some embodiments, the spring assembly 230 may not sit flush to the body when the compression spring 250 may be in the compressed position. The compression spring 250 may be defined to be in the compressed position when the soft close latch 310 interfaces with the sliding doors 100. The sliding doors 100 provide a reaction force onto the spring assembly 230 resulting in the compression spring 250 being compressed.

Figure 10:
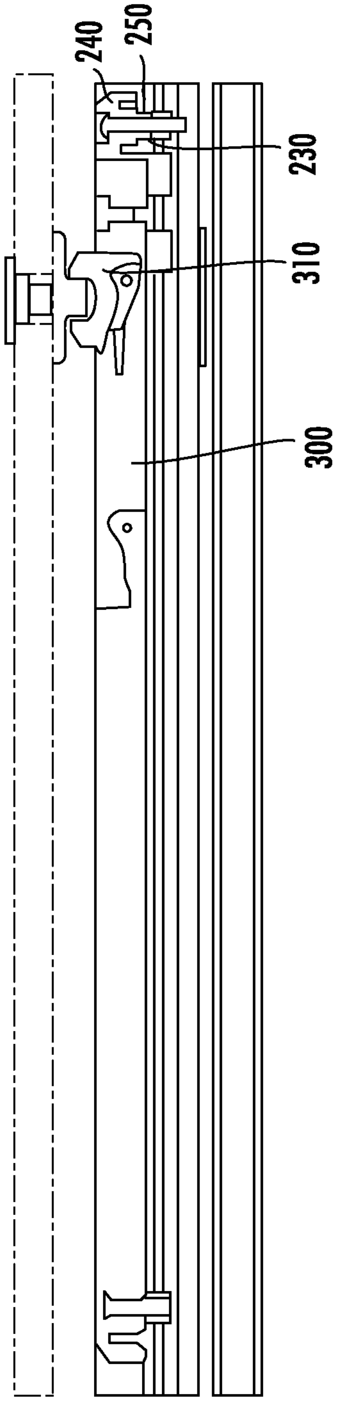
FIG. 10 is a detailed, top view of the slow close assembly of FIG. 2, in an engaged state, according to an exemplary embodiment.

Referring to FIG. 10, a top view of the slow close assembly 160 of FIG. 1 may be shown, in the engaged position. As shown, the soft close latch 310 may be engaged with the sliding doors 100 such that the soft close latch 310 may be pivoted into the body 220 and the compression spring 250 may be in the compressed state. In such an embodiment, the soft close latch 310 may be defined to be substantially parallel to the body 220. In some embodiments, the soft close latch 310 may be positioned perpendicular to the body 220 in the engaged position. The soft close latch 310 mechanically engages the slow close mechanism 300 to dampen the impact force. The system dampening done by the slow close mechanism 300 increases as the soft close latch 310 may be positioned distal to the slow close mechanism 300. In some embodiments, the slow close mechanism 300 provides uniform system dampening independent of the distance between the soft close latch 310 and the slow close mechanism 300.

Figure 11:
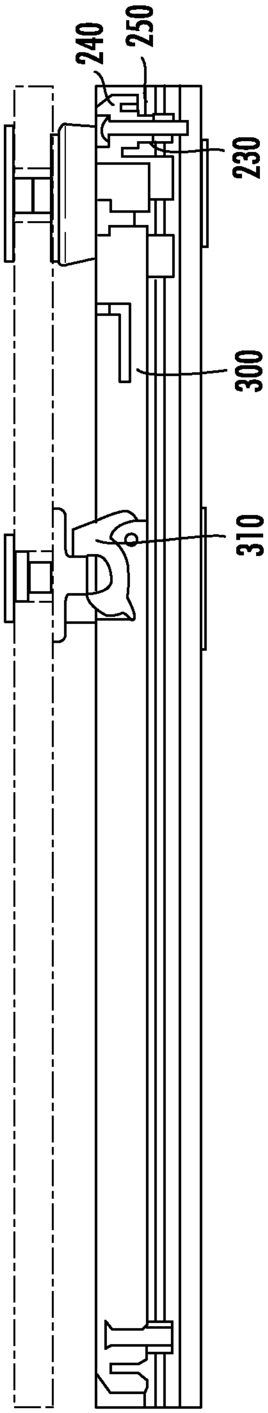
FIG. 11 is a detailed, top view of the slow close assembly of FIG. 2, in a disengaged state, according to an exemplary embodiment.

Referring now to FIG. 11, a top view of the slow close assembly 160 of FIG. 1 is shown, in the disengaged position. As shown, the soft close latch 310 may be disengaged with the sliding doors 100 such that the soft close latch 310 is pivoted away from the body 220 and the compression spring 250 may be in the ready state. In such an embodiment, the soft close latch 310 may be defined to be positioned at an angle from the slow close mechanism 300. In some embodiments, the soft close latch 310 may be positioned parallel to the body 220 in the disengaged position. In still some embodiments, the soft close latch 310 may be positioned substantially perpendicular to the body 220 in the disengaged position.

Referring generally to FIGS. 14-19, a slow close assembly 500 is shown, according to another exemplary embodiment. The slow close assembly 500 may be substantially similar to the slow close assembly 160 described in FIGS. 2-13, and, as such, like components may be used to describe the slow close assembly 500. Accordingly, the description of the like components are reiterated here as if described in full detail. As shown in reference to FIGS. 2-13, the slow close assembly 160 includes a spring assembly 230 that is a separate component from the slow close mechanism 300. As shown in reference to FIGS. 14-19, the slow close assembly 160 does not include a spring assembly that is separate from a slow close mechanism, and instead, a spring directly biases the slow close mechanism.

The slow close assembly 500 includes a slow close mechanism 510, a latch 520 positioned within the slow close mechanism 510, and a spring 530 (e.g., biasing mechanism, etc.) positioned at an end of the slow close assembly 500. The slow close mechanism 510 includes a first end **510*a* and a second end 510*b*. The first end 510*a* and the second end 510*b* may be positioned opposite one another along a length of the slow close mechanism 510. The slow close mechanism 510 may include a length 540. The length 540 may be substantially similar to a distance between the first end 510*a* and the second end 510*b*. The slow close mechanism 510 may further include a width 550. Positioned proximate the first end 510*a* and the second end 510*b* may be one or more fasteners, shown as fasteners 560. The fasteners 560 may be coupled to the slow close mechanism 510 and further be positioned within a rail of a body. The fasteners 560 may be coupled to the slow close mechanism 510 via one or more fasteners, shown as fasteners 570. The fasteners 560, 570** may be one of a nut, bolt, screw, bracket, stud, or the like.

Figure 16:
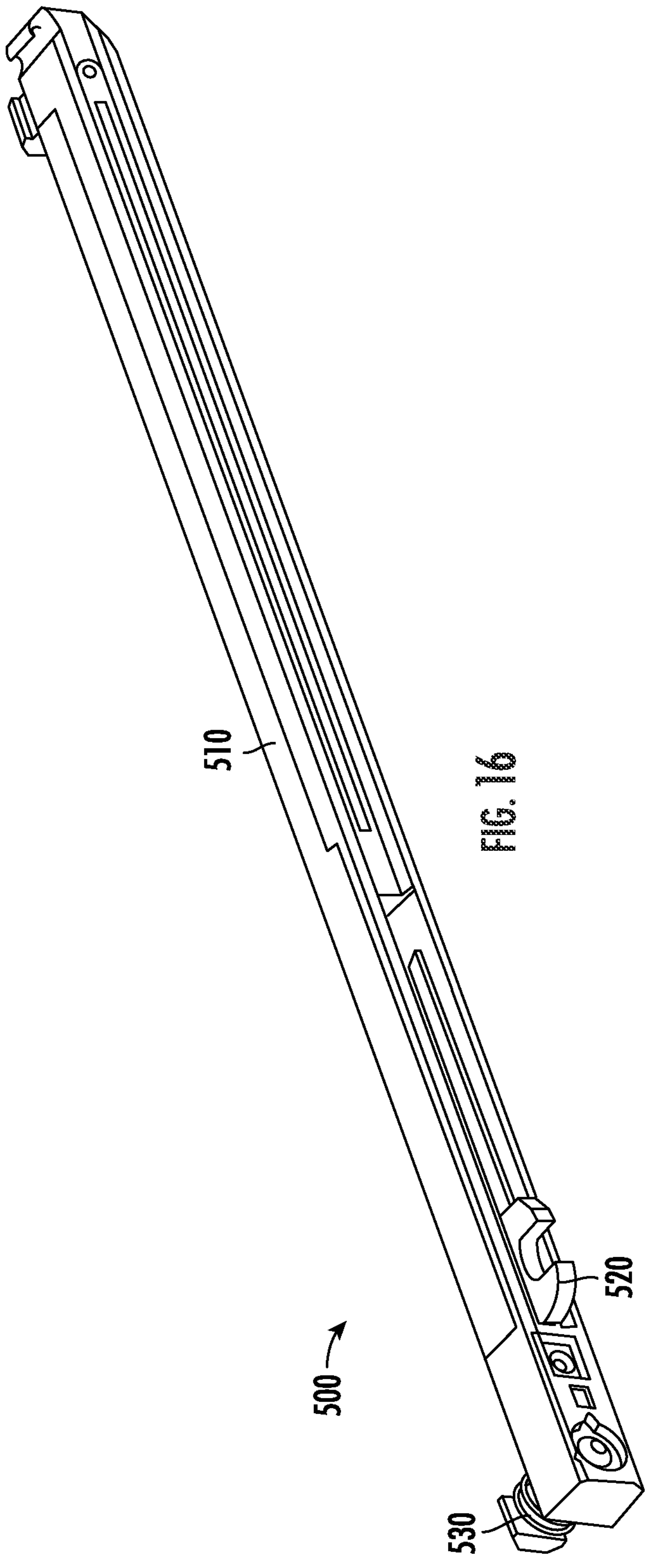
FIG. 16 is a perspective view of the slow close assembly of FIG. 14, shown in a compressed state, according to an exemplary embodiment.
Figure 17:
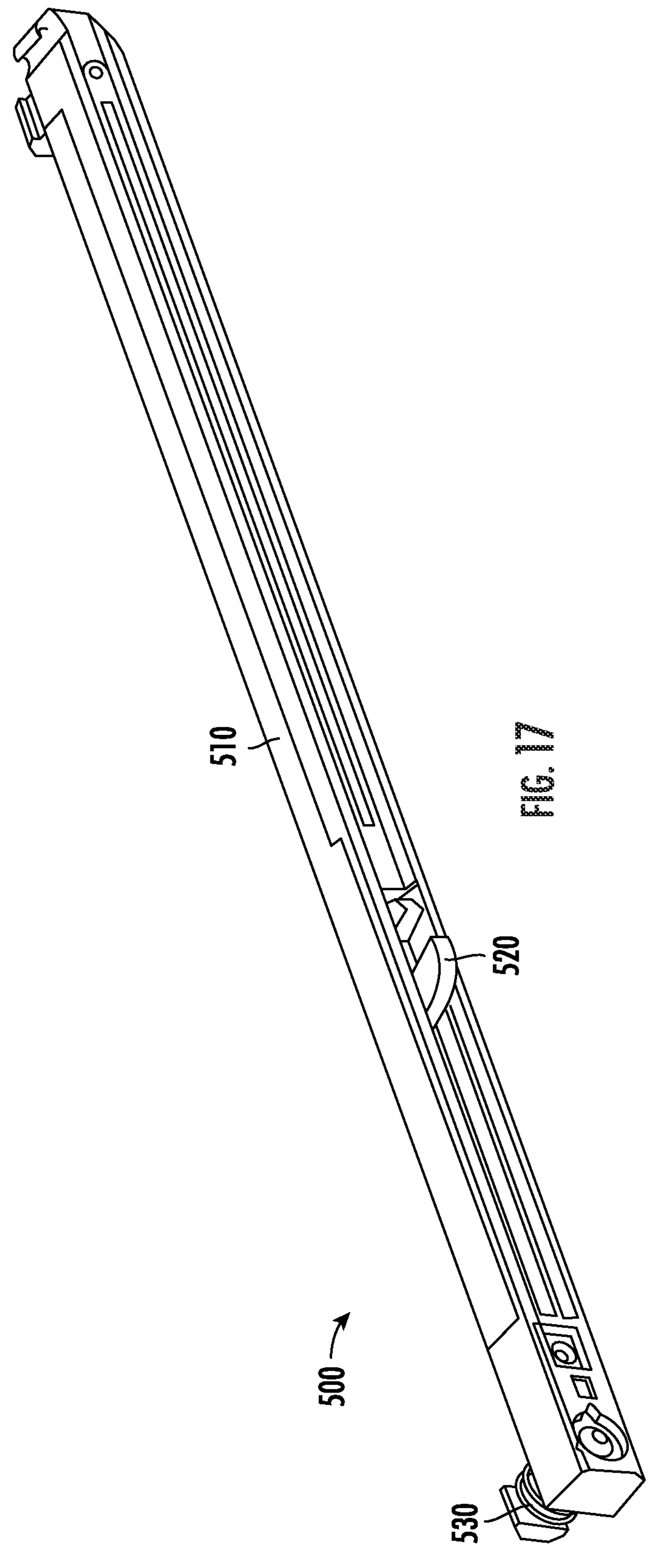
FIG. 17 is a perspective view of the slow close assembly of FIG. 14, shown in a ready state, according to an exemplary embodiment.

The slow close mechanism 510 may be selectively repositionable between a ready state (e.g., shown in FIG. 17) and an elongated state (e.g., shown in FIG. 16). In the ready state, the latch 520 may not be interfaced with anything but be configured to receive a portion of a sliding door, more specifically protrusion 600. In the elongated state, the latch 520 may be interfaced with the protrusion 600. The elongated state may be defined as any position when the slow close mechanism 510 is not in the ready state. Additionally or alternatively, the latch 520 may be pivotably coupled to the slow close mechanism 510. The latch 520 may be pivotably repositionable between an outer position and an inner position. The latch 520 may be in the outer position when the slow close mechanism 510 is in the ready state. Accordingly, the latch 520 may be in the inner position when the slow close mechanism 510 is in the elongated state.

The spring 530 may be positioned proximate the first end **510*a*. Further, the spring 530 may provide a basing force onto the slow close mechanism 510 proximate the first end 510*a* to outwardly provide the slow close mechanism 510. This orientation has the advantageous effect of ensuring that the sliding door always interfaces with the latch 520 to dampen the system. The first end 510*a* is further defined as a free-floating end, where the slow close mechanism 510 may laterally reposition without resistance. In this manner, the spring 530 is positioned proximate a free-floating end to permit substantially limitless movement of the slow close mechanism 510**.

Figure 18:
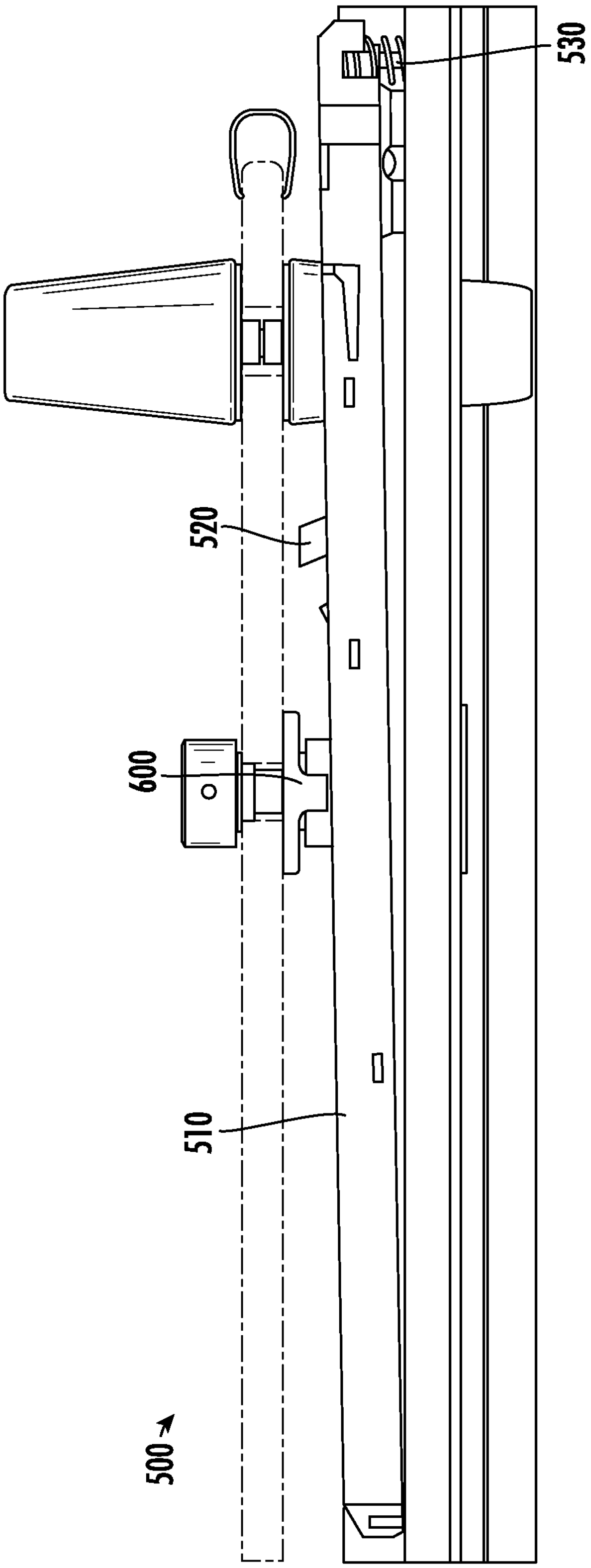
FIG. 18 is a top view of the slow close assembly of FIG. 14, shown in a disengaged state, according to an exemplary embodiment.

Referring specifically to FIG. 18, the slow close mechanism 510 is shown as being in the ready position (e.g., biased). The spring 530 provides a biasing force to push the slow close mechanism 510 into the outward position. The spring 530 may force the slow close mechanism 510 outward at a distance of 0 to 10 mm. In other embodiments, the spring 530 may force the slow close mechanism 510 outward at a distance of more than 10 mm. Since the slow close mechanism 510 is an integral piece with the rest of the slow close assembly 500, the slow close mechanism 510 defines a pitch, angle, or the like, between the first end **510*a* and the second end 510*b***.

Figure 19:
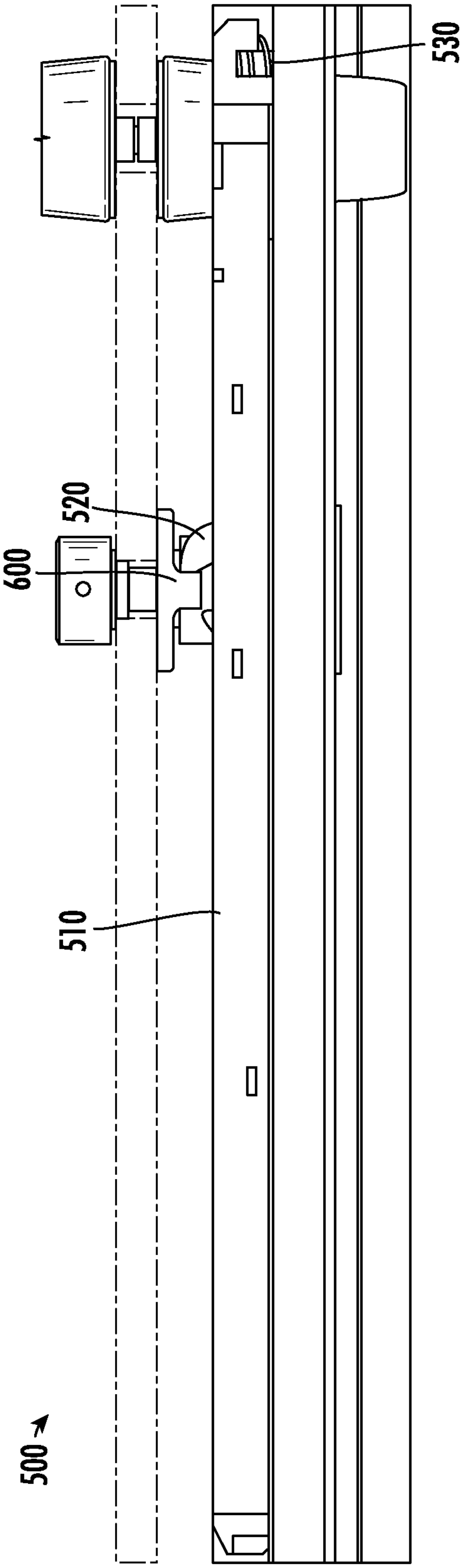
FIG. 19 is a top view of the slow close assembly of FIG. 14, shown in an engaged state, according to an exemplary embodiment.

Referring specifically to FIG. 19, the slow close mechanism 510 is shown as being in the elongated position. The spring 530 is compressed, where the slow close mechanism 510 laterally moves toward the body. In this position, the lateral force provided from the slow close mechanism 510 is greater than or equal to the biasing force provided from the spring 530 to push the sliding door into an open position.

Although the slow close mechanism 160, 500 shown and described herein is in relation to sliding doors, it should be understood that the slow close mechanism 160, 500 may also be utilized with other forms of sliding applications (e.g., drawers, utilities, etc.).

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the slow close assembly 160 of the exemplary embodiment described in at least FIG. 6 may be incorporated with the slow close assembly 500 of the exemplary embodiment described in at least FIG. 14. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A sliding door, comprising:

a frame positioned along at least a portion of the sliding door, the frame comprising a protrusion configured to slide along with the sliding door in a lateral direction; and a slow close assembly repositionable between an outward position and a compressed position, the slow close assembly comprising:

a slow close mechanism laterally positioned within the slow close assembly;

a spring positioned at an end of the slow close assembly and providing an outward force onto the slow close assembly in an outward direction substantially perpendicular to the lateral direction; and a soft close latch configured to engage the protrusion as the protrusion slides along with the sliding door in the lateral direction;

wherein the spring biases the slow close assembly into the outward position when the latch is not engaged with the protrusion;

wherein the latch is pivotably repositionable between an outer position and an inner position, and wherein the protrusion engages the latch to reposition the latch into the inner position;

wherein the latch is in the outer position when the slow close assembly is in the outward position, and wherein the latch is in the inner position when the slow close assembly is in the compressed position.

2. The sliding door of claim 1, wherein the slow close mechanism is configured to provide a lateral force in the lateral direction toward the spring to push the sliding door into an end position.

3. The sliding door of claim 2, wherein the lateral force provided by the slow close mechanism is sufficient to overcome an outward force provided by the spring.

4. The sliding door of claim 1, wherein the slow close assembly further comprises a second frame, the slow close mechanism positioned within the second frame, and wherein the slow close assembly is fixedly coupled to the second frame at an end distal the spring.

5. The sliding door of claim 1, wherein the slow close assembly further comprises a second frame, wherein the spring provides the bias force outward from the second frame, and wherein an end of the slow close assembly proximate the spring is free-floating.

6. The sliding door of claim 1, wherein the slow close mechanism and the spring cooperatively define a dual damping system to control repositioning of the sliding door.

7. The sliding door of claim 1, wherein the slow close assembly further comprises a second frame and a track pivotally attached to the second frame at a pivot point at a first end of the track, wherein the soft close latch slides within the track and the spring applies the outward force at a second end of the track, causing the track to pivot about the pivot point as the slow close assembly moves between the outward position and the compressed position.

* * * * *